Feb. 16, 1932. M. HAUSER 1,845,836
CONDUIT
Filed Aug. 21, 1926
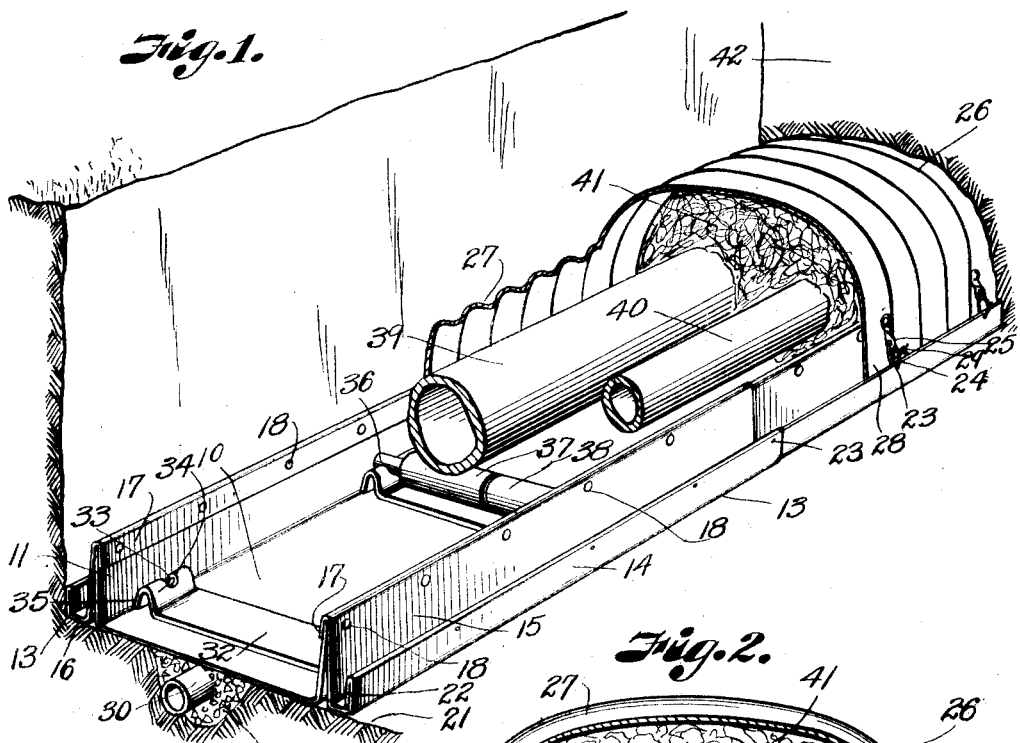
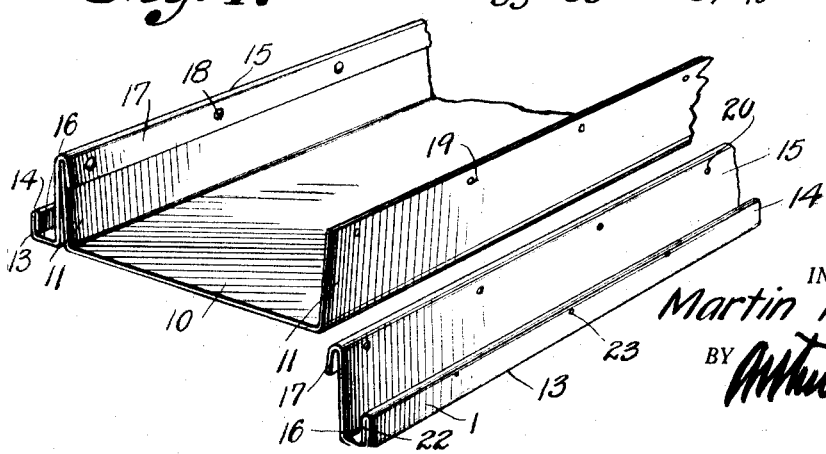
INVENTOR
Martin Hauser.
BY
ATTORNEY Patented Feb. 16, 1932

1,845,836

UNITED STATES PATENT OFFICE

MARTIN HAUSER, OF KANSAS CITY, MISSOURI

CONDUIT

Application filed August 21, 1926. Serial No. 130,641.

My invention relates to conduits and more particularly to a sheet metal conduit for the reception of pipes underground.

It is a purpose of my invention to provide a conduit that is provided with a central channel-shaped portion and grooved side edges, which is so made that the side edge portions thereof can be standardized for all widths of conduit and the central portion of the conduit can be varied to provide for the different widths of conduits desired. This greatly simplifies the manufacture of the conduits not only because of the standardization of parts but because the grooved side edges can be thus formed without the necessity of bending the material a plurality of times in reverse directions which is extremely difficult if not impossible to do. This last mentioned feature of the invention is accomplished due to the fact that the base portion of the conduit is made up of a channelled central main body portion and a pair of duplicate side members which are shaped so as to form grooves at opposite sides of the central channelled portion and which are made separate from the central channel and secured thereto by any suitable means.

It is a further purpose of my invention to provide new and improved means for supporting pipes or similar members within the conduit so that the same can be moved relative to the conduit as the same expand during heating and cooling, said supporting means for the pipes comprising bearing members of sheet metal having upwardly offset portions adjacent the ends thereof that are provided with openings forming recesses for receiving shafts that support rollers upon which the pipes are mounted.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings:

Fig. 1 is a fragmentary perspective view of a portion of a conduit mounted in position in a ditch, portions of the conduit being broken away to more clearly show the interior construction thereof.

Fig. 2 is a transverse sectional view of the conduit.

Fig. 3 is a perspective view of the bearing supporting member and

Fig. 4 is a fragmentary perspective view of the base portion of the conduit, showing one side member assembled therewith and the other side member separated therefrom.

Referring in detail to the drawings:

My improved conduit comprises a central channelled body portion 10 having the slightly outwardly inclined, upstanding flanges 11 at opposite sides thereof. Secured to said flanges 11 are the side members 13 which are made separately and which are the same for all size conduits, the dimensions of the member 10 alone being varied for different width conduits. The members 13 are substantially channel shaped in cross section and have a shorter leg portion 14 and a longer leg portion 15 extending at slightly oblique angles to each other and connected by means of the flat bottom portion 16. The longer leg portion 15 of the member 13 is provided with a hook-like flange portion 17 which is adapted to engage around the upper edge portion of one of the side flanges 11 and to be secured thereto by means of the rivets 18 extending through the openings 19 and 20 in the members 11 and 13 respectively. The length of the portion 15 is substantially the length of the flange 11. Thus the flat portion 16 will rest upon the bottom 21 of the ditch when the conduit is in the position shown in Fig. 1. The short leg portion 14 is preferably provided with an inturned lip portion 22 overlying the portion 14 on the inner side thereof to strengthen and reinforce the same, thus providing a two-ply flange portion on the outside of the conduit at each side thereof.

Said two-ply flange portion is provided with openings 23 which receive the flexible tie members 24 that extend through the perforated ears 25 mounted on the cover member 26. The cover member is arch shaped transversely and is preferably longitudinally corrugated as indicated at 27, the lower free edges 28 of the cover member 26 seating in the grooves in the side members 13 firmly when the tie members 24 are drawn tight and the free ends thereof twisted together as indicated at 29. The bottom of the ditch is preferably provided with drain tiles 30 which may be embedded in crushed rock 31 or mounted in any other desired manner.

Mounted in the channel member 10 and engaging flatly with the bottom thereof are the bearing members 32 which are preferably made of sheet metal and have elongated flat body portions engaging face to face with the bottom of the channel member 10. The members 32 are preferably provided with substantially circular openings punched out of the same when the said member is in a flattened condition and thereafter the ends are struck up to form the bowed, upwardly offset portions 33 adjacent the opposite ends thereof, the openings 34 which were previously punched therein lying at the apexes of the portions 33 and serving as bearing grooves, as will be pointed out below. The extreme end portions 35 of the member 32 will rest upon the member 10 adjacent the bases of the flanges 11 when the parts are in position as shown in Figs. 1 and 2.

Mounted upon the upwardly offset portions 33 of the members 32 and seated in the grooves formed by the openings 34 are the shaft members 36 upon which the tubular roller members 37 and 38 are rotatably mounted. Supported upon the roller members 37 and 38 respectively are the pipes 39 and 40, said pipes being preferably embedded in insulating material 41 which may be mineral wool or any other desired heat insulating material. After the parts are in position within the conduit the cover 26 is put in place, the tie members 24 are tightened up and the conduit is covered with earth 42 or any other desired material. It will be noted that when the parts are in the position shown in Figs. 1 and 2, the top edge portion of the flange or leg 14 of the side member 13 will be below the top edge 11 of the central member 10. As a result, any water accumulating within the channel formed within the member 13 at either side of the conduit will flow over the flange 14 and out of the channel before reaching the side of the flange 11, thus preventing the entrance of water into the interior of the conduit.

What I claim and desire to secure by Letters Patent is:

1. A conduit including a base comprising a bottom adapted to engage a ground surface on which the conduit is installed and upstanding side flanges, separate side members having inwardly downbent upper edge flanges hooked over the upper edges of said side flanges of the ground engaging base, and having lower edge portions bent outwardly to form seats extending substantially in the same plane as the bottom of the base for engaging said ground surface, said seats having upwardly bent outer edge portions forming grooves, and an arch having lower edges removably seated in said grooves.

2. A conduit including a base comprising a flat bottom and substantially vertical side flanges having upper edges parallel with the bottom, side members having upper edges bent inwardly and downwardly to form hooks engaging over the upper edges of said side flanges, means for attaching the hooks to said side flanges of the base, the side members being bent outwardly substantially at right angles on lines spaced from the hooks a distance equal to the height of the side flanges of the base to form flat seats in the plane of the bottom of the base, said seats having upstanding outer edge flanges substantially shorter than the height of the side members, and an arched cover having lower edges receivable on the seats.

3. A pipe conduit of the character described, including a base having upstanding side flanges forming a channel, separate side members having inwardly downturned upper edge flanges hooked over the upper edges of said side flanges and having upwardly outbent lower edge flanges forming grooves, an arch covering the base including side portions having lower edges movably seated in the grooves of said side members, insulating material filling the chamber formed by the base and arch, and flexible means attached to said outbent flanges for connecting the side members to the arch.

4. In a conduit including a base having a bottom and an upstanding side edge flange, and a cover including a depending edge portion, a side member having an inwardly bent upper edge flange adapted to be hooked over the upper edge of said base flange and having a lower edge portion bent outwardly to form a seat for said cover edge portion adapted to extend substantially in the same plane as the bottom of the base and having an upwardly bent outer edge portion forming a groove to receive said cover edge portion.

In testimony whereof I affix my signature.

MARTIN HAUSER.